C. F. BURGESS.
BATTERY HAND LAMP.
APPLICATION FILED SEPT. 15, 1917.
1,299,909.
Patented Apr. 8, 1919.
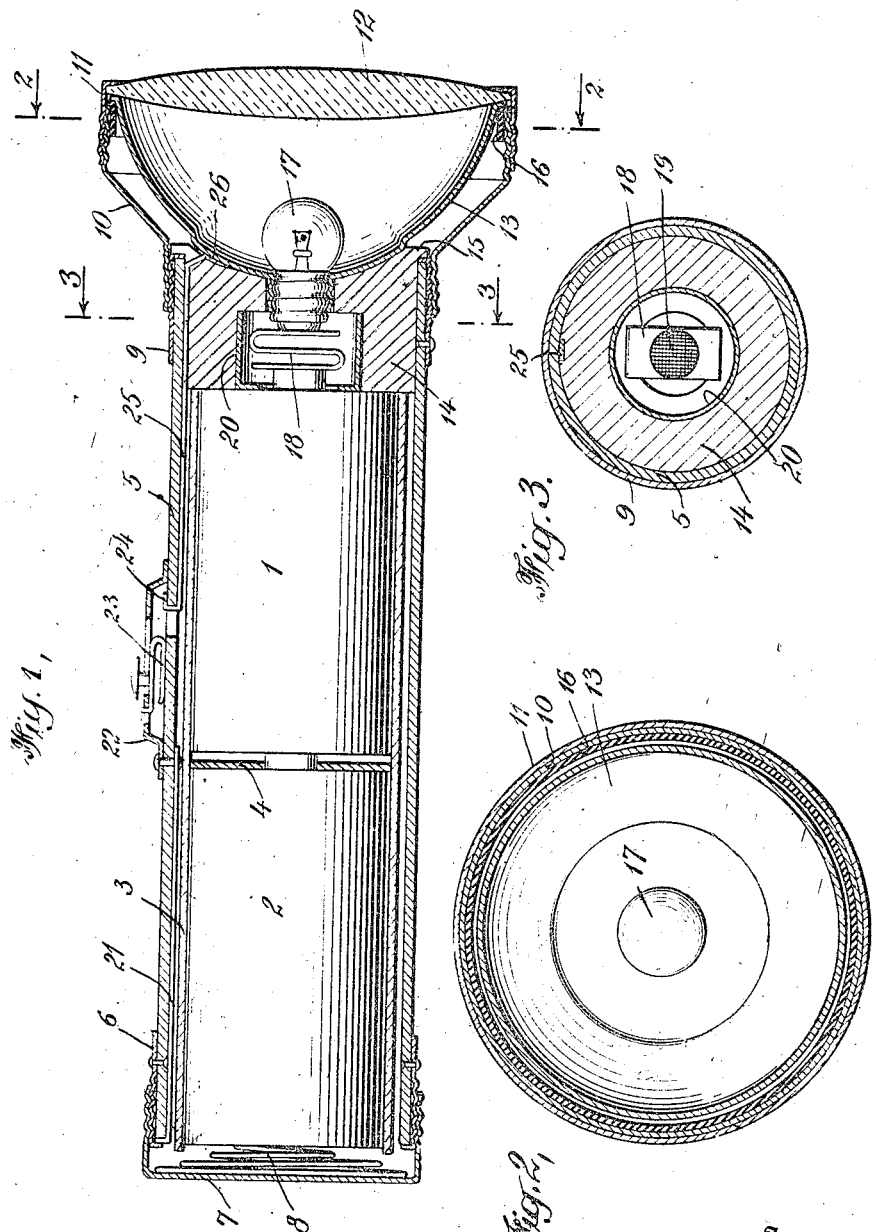
Inventor
Charles F. Burgess.
By his Attorneys
Pennie Davis Marvin & Edmonds

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

BATTERY HAND-LAMP.

1,299,909.   Specification of Letters Patent.   Patented Apr. 8, 1919.

Original application filed March 1, 1916, Serial No. 81,301. Divided and this application filed September 15, 1917. Serial No. 191,549.

*To all whom it may concern:*

Be it known that I, CHARLES F. BURGESS, a citizen of the United States, residing at Madison, county of Dane, State of Wisconsin, have invented certain new and useful Improvements in Battery Hand-Lamps, (division of Serial No. 81,301, filed March 1, 1916;) and I do hereby declare the following to be a full, clear, and exact description of the invention, such as will enable others skilled in the art to which it appertains to make and use the same.

The present invention relates to battery hand lamps of a type adapted for carrying in the pocket and provided with a miniature lamp to which current may be delivered from a battery inclosed in the casing of the device.

It is an object of the present invention to provide means of the general character disclosed in my Patent No. 1,084,926, issued January 20, 1914, for protecting the lamp against accidental lighting, by so inclosing certain parts of the electrical connections that accidental contact across the exposed metal parts of the device will not be effective to light the lamp.

By making a certain part of insulating material and by suitably arranging it in the end of the casing, it can serve the function of supporting certain of the conductive elements, notably the lamp reflector, and will keep these elements out of contact with other metal parts through which current might otherwise flow to accidentally light the lamp.

For a more complete understanding of these and other objects and advantages of the invention, reference is made to the following description, which is to be taken in conjunction with the accompanying drawings, wherein—

Figure 1 is a sectional elevation of a tubular hand lamp;

Fig. 2 is a transverse section on the line 2—2; and

Fig. 3 is a similar section on the line 3—3.

In the embodiment illustrated, a pair of battery cells 1 and 2, or other suitable number, are arranged end to end in usual manner within a pasteboard tube 3. Interposed between the cells is a paraffined washer 4 which serves to protect the lower cell in case of failure of its seal and leakage of its electrolyte, and in case through accident the central or carbon electrode of the cell is forced down through the sealing material so that except for the washer the cell would be short-circuited through the zinc of the cell immediately above.

The battery is housed in a casing 5, here illustrated as comprising a tube of insulating material, preferably fiber, reinforced at its rear or bottom end with a threaded metal collar 6 to which is detachably secured an end cap 7 provided with a spiral spring 8 which bears against the naked bottom of the lowermost cell of the battery to establish electrical connection therewith.

The other end of the tubular casing is reinforced with an exposed metal collar 9 having a screw thread pressed therein for engagement with a flaring collar 10. The latter, together with a flanged member 11, serves to hold lens 12 and reflector 13 to their seats.

Within the front end of the tubular battery casing of the preferred embodiment illustrated by the drawing is a bumper block 14 consisting of insulating material and preferably having its front edge shaped to form a flange 15 which overlaps the end of the casing. Reflector 13 is seated in the recessed front face of the bumper block 14 and has its outer edge insulated from the adjacent metal parts 10 and 11 by means of a fiber ring 16 provided with an outwardly extending flange which lies over the outer edge of collar 10 and forms a seat against which the edges of the reflector and of the lens may be clamped.

An incandescent lamp 17 is threaded into a tubular extension of the metal reflector and has its base projecting down into an enlarged recess in the bumper block where the central terminal of the lamp may engage a spring 18 between the lamp and the central or carbon terminal of the topmost battery cell. Spring 18 preferably consists of a strip of metal shaped to approximate the form of the letter S and having its top and bottom faces roughened as at 19 (Fig. 3) to insure good electrical contact with the battery terminal and with the lamp terminal.

As a means for preventing accidental displacement of the spring 18, while permitting some movement and adjustment thereof within the bumper block, there is provided a metal thimble 20 fitted in to the enlarged recess of the bumper block and provided with a flange serving as a guard to prevent accidental escape of spring 18.

With the parts assembled as above described, the battery is held against the bumper block by the coiled spring 8 and the spring 18 establishes electrical connection to the lamp but limits the pressure to which the base of the lamp is subjected. If the device is dropped, the battery can oscillate in the casing without subjecting the lamp to destructive impact, and, similarly, too tight adjustment of the bottom cap 7 is without injurious effect on the lamp and cannot crush the upper carbon electrode through its sealing material and into the battery cell 1.

As a means for establishing electrical connection from the bottom of the battery to the lamp, I make use of a conductor 21 contacting with the metal collar 6 and, therefore, connected with spring 8. This conductor 21 is riveted to a housing 22 mounted near the middle of the tubular casing. The housing may be provided with a sliding contact device of the type disclosed and claimed in the patent to Maisel, No. 1,082,887, issued December 30, 1913, and comprising a U-shaped strip of resilient metal having its inner leg 23 arranged to slide along the outer face of the fiber tube into and out of contact with a lug 24. Other well known devices of proper construction may, of course, be used for completing the connection between conductor 21 and lug 24. This lug 24 may consist of the clenched end of a metal strip 25 which extends along the side of the insulating tube between it and the bumper block 14 and has its front end 26 lying against reflector 13 to establish electrical connection therewith.

With this arrangement of circuits the outer terminal of lamp 17 is electrically connected with reflector 13 and conductor 25, but normally is insulated from all other parts of the device and particularly is insulated from all exposed metal parts, and consequently an accidental lighting of the lamp by bridging its exposed metal parts is not possible.

To renew the batteries, it is only necessary to unscrew cap 7, for the batteries may then be slipped out and new ones put in their place, and even though the new ones be dropped in carelessly, they cannot strike a hard blow against the lamp base but will be stopped by the bumper block 14 against which the battery container bears when the central electrode enters the recess in the bumper block. Other parts of this structure are also easily accessible, for by unscrewing the lens holder, the lens and the reflector and its lamp may be taken out, and then by bending up the hooked end 26 of the conductor 25, the impact block and its spring 18 may be withdrawn through the front end of the casing.

I claim:—

1. In a hand lamp, the combination of an insulating tube of fiber, a battery therein, a metal collar reinforcing the rear end of said tube, a cap secured to said collar and closing the rear end of said tube, said cap being removable to permit removal of the battery through said rear end, a spring carried by said cap and engaging the bottom of said battery and establishing electrical connection therewith and with said cap, a lamp connected to the other end of said battery, a reflector into which said lamp is threaded, said reflector receiving support from below, a flaring metal collar at the front end of said fiber tube, a lens for said lamp, a holder for said lens threaded to said flaring collar, a conductor connected with said reflector and insulated from said flaring collar and from said lens holder, a housing on said fiber tube beneath which said conductor terminates, and thumb-controlled means for electrically connecting said conductor with said end cap when the lamp is to be lighted.

2. In a hand lamp, the combination of an insulating tube of fiber, a battery therein, a threaded metal collar reinforcing the rear end of said tube, a cap threaded to said collar and closing the rear end of said tube, said cap being removable to permit removal of the battery through said rear end, a spring carried by said cap and engaging the bottom of said battery and establishing electrical connection therewith and with said cap, a lamp connected to the other end of said battery, a reflector to which said lamp is threaded, insulating means supporting said reflector from below, a threaded metal collar reinforcing the front end of said tube, a flaring metal collar threaded to said reinforcing collar and also having threads at its front end, the edge of the reflector being out of electrical engagement with said threaded front end, a lens for said lamp, a holder for said lens threaded to said flaring collar, a conductor connected with said reflector and insulated from said flaring collar and from said lens holder, and conductive means controllable from approximately the center of said fiber tube for electrically connecting said conductor with the bottom end cap when the lamp is to be lighted.

3. In a hand lamp, the combination of an insulating tube of fiber, a battery therein, a threaded metal collar reinforcing the rear end of said tube, a cap threaded to said collar and closing the rear end of said tube, said cap being removable to permit removal of the battery through said rear end, a spring carried by said cap and engaging the bottom of said battery and establishing electrical connection therewith and with said cap, a lamp connected to the other end of said battery, a reflector in which said lamp is mounted, said reflector receiving support from the end of said tube of fiber, a threaded metal collar reinforcing the front end of said tube, a flaring metal collar threaded to said reinforcing collar and also having threads at its front end, a ring of insulating material lining said threaded front end and holding the edge of the reflector out of electrical engagement therewith, a lens for said lamp, a holder for said lens threaded to said flaring collar, a stationary conductor within said fiber tube having its free front end bent to yieldingly engage said reflector, the other end of said conductor terminating beneath a housing positioned on the side of said fiber tube, said conductor being insulated from said lens holder and its supporting collar, and conductive means controllable at said housing for electrically connecting said conductor with said bottom end cap when the lamp is to be lighted.

In testimony whereof I affix my signature.

CHARLES F. BURGESS.